(12) United States Patent
Inarida et al.

(10) Patent No.: US 9,090,165 B2
(45) Date of Patent: Jul. 28, 2015

(54) DRIVING SYSTEM, DRIVING SYSTEM FOR RAILROAD-VEHICLE, AND RAILROAD-VEHICLE AND MULTI-CAR TRAIN MOUNTED WITH SAME

(75) Inventors: Satoru Inarida, Hitachinaka (JP); Koji Agatsuma, London (GB); Kento Mochizuki, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 127 days.

(21) Appl. No.: 13/982,793

(22) PCT Filed: Jan. 10, 2012

(86) PCT No.: PCT/JP2012/050259
§ 371 (c)(1),
(2), (4) Date: Jul. 31, 2013

(87) PCT Pub. No.: WO2012/105282
PCT Pub. Date: Aug. 9, 2012

(65) Prior Publication Data
US 2013/0313059 A1    Nov. 28, 2013

(30) Foreign Application Priority Data

Jan. 31, 2011    (JP) .................... 2011-017387

(51) Int. Cl.
*H02J 1/00*    (2006.01)
*B60L 5/36*    (2006.01)
(Continued)

(52) U.S. Cl.
CPC ... *B60L 5/36* (2013.01); *B60L 9/28* (2013.01); *B60L 11/08* (2013.01); *B60L 15/007* (2013.01); *H02J 1/00* (2013.01); *B60L 2200/26* (2013.01); *B60L 2210/30* (2013.01); *B60L 2210/40* (2013.01); *Y10T 307/658* (2015.04)

(58) Field of Classification Search
CPC ........... H02J 1/00; B60L 5/36; Y10T 307/658
See application file for complete search history.

(56) References Cited

U.S. PATENT DOCUMENTS 5,701,980 A * 12/1997 Lee .................................. 191/4
6,075,717 A *  6/2000 Kumar et al. .................. 363/87
(Continued)

FOREIGN PATENT DOCUMENTS

DE    10 2007 032 776 A1    1/2009
EP        0 693 820 A1    1/1996
(Continued)

OTHER PUBLICATIONS

Extended European Search Report, mailed Apr. 9, 2015, which issued during the prosecution of European Application No. 12742252.5, which corresponds to the present application.

*Primary Examiner* — Emily P Pham
(74) *Attorney, Agent, or Firm* — Baker Botts L.L.P.

(57) ABSTRACT

A system corresponding to a plurality of different power sources (overhead contact line, power generator driven by engine, and fuel cells) is proposed as a method of using an optimum power supply in an electrified route and a non-electrified route. Provided are: a power conversion circuit that includes AC input ends, the number of which corresponds to the maximum number of phases among a plurality of different AC power supplies, and that converts AC power to a direct current; and switching means for switching a connection state of the AC power supplies and the power conversion circuit, wherein the connection state is switched according to the power supplies.

19 Claims, 12 Drawing Sheets

(51) Int. Cl.
*B60L 9/28* (2006.01)
*B60L 15/00* (2006.01)
*B60L 11/08* (2006.01)

(56) References Cited

U.S. PATENT DOCUMENTS

| | | | |
|---|---|---|---|
| 7,791,292 B2* | 9/2010 | Glasl et al. | 318/139 |
| 8,596,434 B2* | 12/2013 | Kitanaka | 191/2 |
| 2003/0128561 A1* | 7/2003 | Azuma et al. | 363/65 |
| 2004/0216636 A1 | 11/2004 | Emori et al. | |
| 2006/0005739 A1* | 1/2006 | Kumar | 105/35 |
| 2008/0192513 A1* | 8/2008 | Kusubayashi | 363/21.01 |
| 2009/0101419 A1* | 4/2009 | Okayama et al. | 180/65.8 |
| 2014/0097670 A1* | 4/2014 | Tanaka | 307/9.1 |

FOREIGN PATENT DOCUMENTS

| | | |
|---|---|---|
| EP | 1 186 497 A1 | 3/2002 |
| JP | 57-83102 | 5/1982 |
| JP | 9-168204 | 6/1997 |
| JP | 11-113102 | 4/1999 |
| JP | 2002-135906 | 5/2002 |
| JP | 2004-312939 | 11/2004 |
| JP | 2004-312953 | 11/2004 |
| JP | 2009-148016 | 7/2009 |
| JP | 2010-215014 | 9/2010 |
| WO | WO 2009/138291 A1 | 11/2009 |
| WO | WO 2010/103859 A1 | 9/2010 |
| WO | WO 2010/146643 A1 | 12/2010 |

* cited by examiner

EXAMPLE OF CONFIGURATION OF MULTI-CAR TRAIN MOUNTED WITH DRIVING SYSTEM ACCORDING TO CONVENTIONAL EXAMPLE SHOWN IN FIG. 6 (WHEN CONVERSION CIRCUITS FOR MAIN TRANSFORMER OUTPUT AND FOR POWER GENERATION UNIT OUTPUT ARE SEPARATELY INCLUDED)

EXAMPLE OF CONFIGURATION OF MULTI-CAR TRAIN MOUNTED WITH DRIVING SYSTEM ACCORDING TO EMBODIMENT SHOWN IN FIG. 1 (WHEN CONVERSION CIRCUITS FOR MAIN TRANSFORMER OUTPUT AND FOR POWER GENERATION UNIT OUTPUT ARE STANDARDIZED)

DRIVING SYSTEM, DRIVING SYSTEM FOR RAILROAD-VEHICLE, AND RAILROAD-VEHICLE AND MULTI-CAR TRAIN MOUNTED WITH SAME

The present application is the U.S. National Phase of International Application No. PCT/JP2012/050259, filed on Jan. 10, 2012, which claims the benefit of Japanese Patent Application No. 2011-017387, filed Jan. 31, 2011, the entire contents of which are hereby incorporated by reference.

TECHNICAL FIELD

The present invention relates to a driving device of an electric motor, and particularly, to a driving device for railroad-vehicle that obtains power from a plurality of different power sources.

BACKGROUND ART

A railway includes two types of routes: a route provided with a facility that supplies power to a train from the ground through a trolley wire or a third rail (hereinafter, called "electrified route"); and a route without a power supply facility from the ground, in which power generation means is included in the train obtains power (or motive power is obtained from a motive power source) (hereinafter, called "non-electrified route"). In the electrified route, regenerative electric power generated during braking of the train can be consumed by another train. Therefore, the energy efficiency is generally higher in the electrified system, and there is a tendency to preferentially electrify routes with a greater number of trains. Recently, a plan for electrifying non-electrified routes is developed on the background of the rise in the energy price.

Meanwhile, a train that can travel regardless of whether the route is electrified or non-electrified is desirable to efficiently operate the train. An example of widely used means for realizing such a train includes a system of pulling a train formation including vehicles without electric power sources/motive power sources by an electric locomotive in the electrified route and pulling the train formation by a diesel locomotive including an internal combustion engine as a motive power source in the non-electrified route.

Regardless of whether the locomotive is an electric locomotive or a diesel locomotive, a locomotive is provided with a large number of apparatuses, and the weight of the locomotive is usually several times higher than the weight of a passenger car constituting the train. For example, compared to a power-dispersed train, such as a Shinkansen train travelling in Japan, in which a driving device and other functions necessary for the train are dispersed, the locomotive has a problem that the track is significantly damaged by a heavy axle or has a problem that there is a limit to speeding up the train because a large-capacity brake device is necessary for a vehicle with concentrated weight.

On the other hand, a function-dispersed train needs to have the functions optimized for each of the electrified route and the non-electrified route, and there is a problem that the functions cannot be shared.

To solve the problems, Patent Literature 1 provides a railroad-vehicle driving device and means for realizing a railroad-vehicle using the railroad-vehicle driving device, the device including: power generation means based on an overhead contact line voltage or a diesel engine (and fuel cells/gas cells), that is, different power sources (FIGS. 1: 11, 12, 21, and 31 in Literature 1); and power converters that convert power obtained from the power sources to DC voltages to change the power to DC voltages (FIGS. 1: 13, 20, and 32 in Literature 1), wherein the problems can be solved by appropriately switching the power sources and the power converters according to the travelling route.

CITATION LIST

Patent Literature

Patent Literature 1: EP 1 186497 A1, Railway vehicle with power supply system, ALSTOM LHBGmbH

SUMMARY OF INVENTION

Technical Problem

However, in Literature 1 described above, each power source (overhead contact line, power generator driven by engine, and fuel cells) needs an appropriate power converter (FIGS. 1: 13, 25, and 32 in Literature 1) that converts the voltage of the power source to a DC voltage (FIG. 1: 1 in Literature 1). Therefore, there are problems of an increase in the weight of the formation of the train, a reduction in the degree of freedom of the train formation because the mounting space needs to be reserved, an increase in the maintenance cost, a reduction in the reliability caused by an increase in the number of components, and the like. The number of apparatuses is large, and the apparatuses cannot be housed in one vehicle. Therefore, the apparatuses need to be dispersed to a plurality of vehicles, and there is a problem that the freedom of formation is obstructed.

Solution to Problem

Provided are: a first power conversion circuit that converts AC power to DC power; and a second power conversion circuit that drives an electric motor by using the DC power converted by the first power conversion circuit as a power supply, wherein the first power conversion circuit is connected to a plurality AC power supplies. Further provided is switching means, connected between the plurality of AC power supplies and the first power conversion circuit, for connecting part of the plurality of AC power supplies to the first power conversion circuit, and the first power conversion circuit performs a power conversion operation according to the AC power supply connected by the switching means.

Alternatively, provided is a plurality of AC power supplies that supply AC power with different numbers of phases, wherein a first power conversion circuit performs an operation of converting AC power supplied by an AC power supply connected by switching means to DC power according to the number of phases of the AC power.

Alternatively, at least AC input ends, the number of which corresponds to the number of phases of an AC power supply with the maximum number of phases among a plurality of different AC power supplies, are included, and semiconductor elements are operated according to AC power of an AC power supply connected by a contactor to convert the AC power to DC power.

Advantageous Effects of Invention

According to the present invention, power conversion circuits that convert AC power supplied from a plurality of AC power supplies to DC power are standardized to increase an operating ratio. In this way, power conversion devices do not have to be provided for each AC power supply, and a driving system including a plurality of different AC power supplies can be downsized, lightened, and simplified. In an application to multi-car railroad-vehicles, different AC power supplies can be handled, and an improvement in the reliability can be expected due to a reduction in the weight of the multi-car train, a reduction in the maintenance cost, and a reduction in the number of components. As devices are downsized and lightened, the degree of freedom in mounting the devices is increased, and the degree of freedom in composing the multi-car train is also increased. Therefore, more versatile railroad-vehicles can be provided.

DESCRIPTION OF EMBODIMENTS

Embodiments of the present invention will now be described with reference to the drawings. An example of a driving system for railroad-vehicle of the present invention and an example of application to a railroad-vehicle formation will be described with reference to FIGS. 1 to 6.

[First Embodiment]

Figure 1:
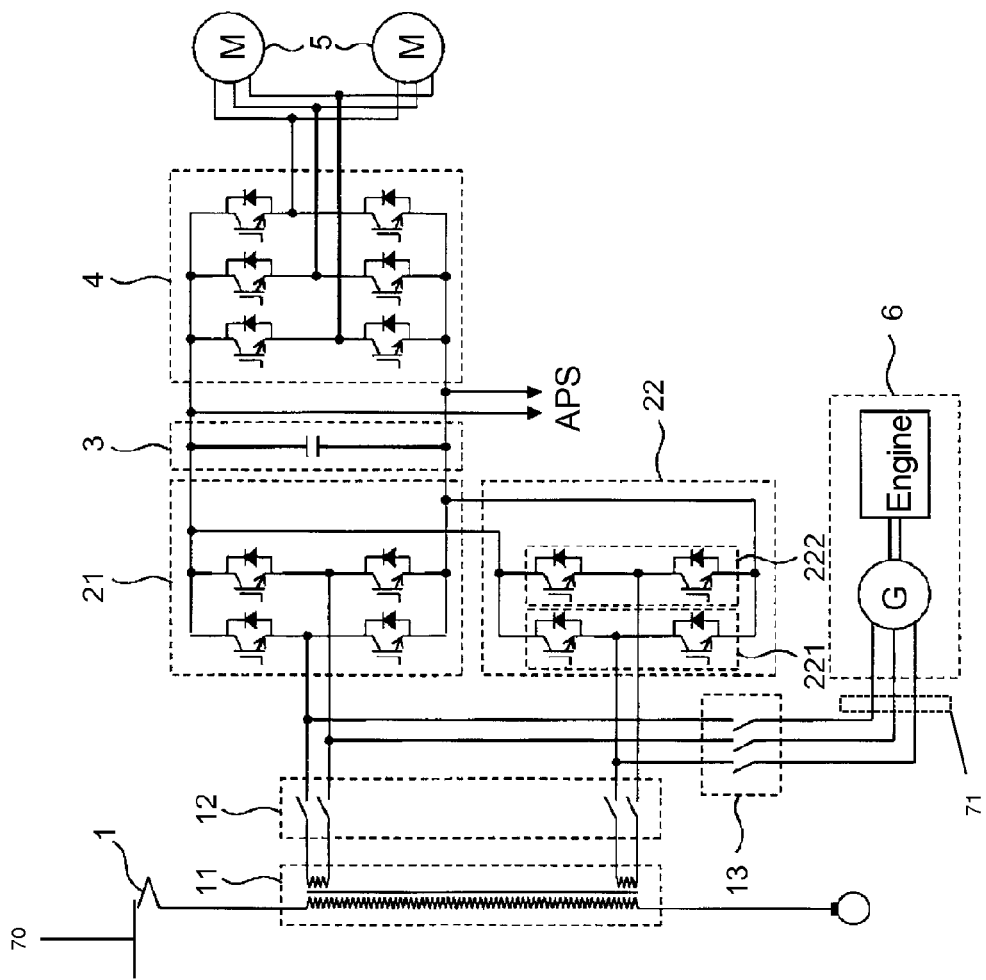
FIG. 1 is a driving system diagram showing an embodiment of the present invention.

As shown in FIG. 1, a driving system of the present embodiment includes: a power collector 1, e.g., a pantograph, that receives single-phase AC power from an overhead contact line 70 connected to a substation that is a single-phase AC power supply; and a main transformer 11 that steps down an overhead contact line voltage. Two wires are arranged on the low pressure side of the main transformer 11, and a single-phase alternating current is supplied to each wire. The driving system is a driving system for railroad-vehicle including a power conversion circuit 21 for power supply and a power conversion circuit 22 for power supply, each including two phases of switch circuits and converting AC power to DC power, the switching circuits formed by connecting two connectors in series, the connectors including semiconductor elements (for example, IGBT) with self-extinction capability and diodes connected in antiparallel. The driving system further includes: a contactor 12 connected between the main transformer 11 and the power conversion circuits 21 and 22 for power supply; a smoothing capacitor 3 that is connected to the DC side of the power conversion circuits 21 and 22 for power supply and that smoothes a DC voltage; a conversion circuit 4 for driving electric motor that includes a combination of semiconductor elements and that drives a main electric motor 5 by using the voltage at both ends of the smoothing capacitor 3 as a voltage source; a power generation unit 6 that includes an engine and a power generator connected to the engine and that supplies a three-phase AC power supply 71; connection points of the main transformer 11 and the power conversion circuits 21 and 22 for power supply (AC sides of the power conversion circuits 21 and 22 for power supply); and a contactor 13 connected to a three-phase AC output of the power generation unit 6.

In the example of FIG. 1, when the train travels under an overhead contact line, that is, in an electrified route, the contactor 12 is closed, and the contactor 13 is opened. The main transformer 11 supplies single-phase AC power to the power conversion circuits 21 and 22 for power supply. Therefore, the semiconductor elements constituting the power conversion circuits 21 and 22 for power supply are appropriately switched to convert a single-phase alternating current to a direct current. In this way, the power conversion circuits 21 and 22 for power supply convert a single-phase AC voltage supplied from the overhead contact line to obtain a DC voltage, and the conversion circuit 4 for driving electric motor drives the main electric motor 5.

On the other hand, when the train travels a route without an overhead contact line, that is, in a non-electrified route, the contactor 12 is opened, and the contactor 13 is closed. Two phases of the three-phase alternating current supplied from the power generation unit 6 are connected to the AC side of the power conversion circuit 21 for power supply, and the remaining one phase is connected to the semiconductor element constituting one phase 221 of the power conversion circuits for two phases constituting the power conversion circuit 22 for power supply. The semiconductor elements constituting the one phase 221 of the power conversion circuit 22 for power supply and the power conversion circuits of the two phases of the power conversion circuit 21 for power supply are appropriately switched to convert the three-phase alternating current to a direct current, and the three-phase AC output voltage of the power generation unit 6 is converted to a DC voltage. To prevent unnecessary switching, an off command is provided to the semiconductor elements constituting one phase 222 of the power conversion circuit 22 for power supply that is not switched. The advantageous effects of the present invention can be attained by performing the control described above when the vehicle is travelling under the overhead contact line (electrified route) and the overhead contact line is in an abnormal state.

Figure 6:
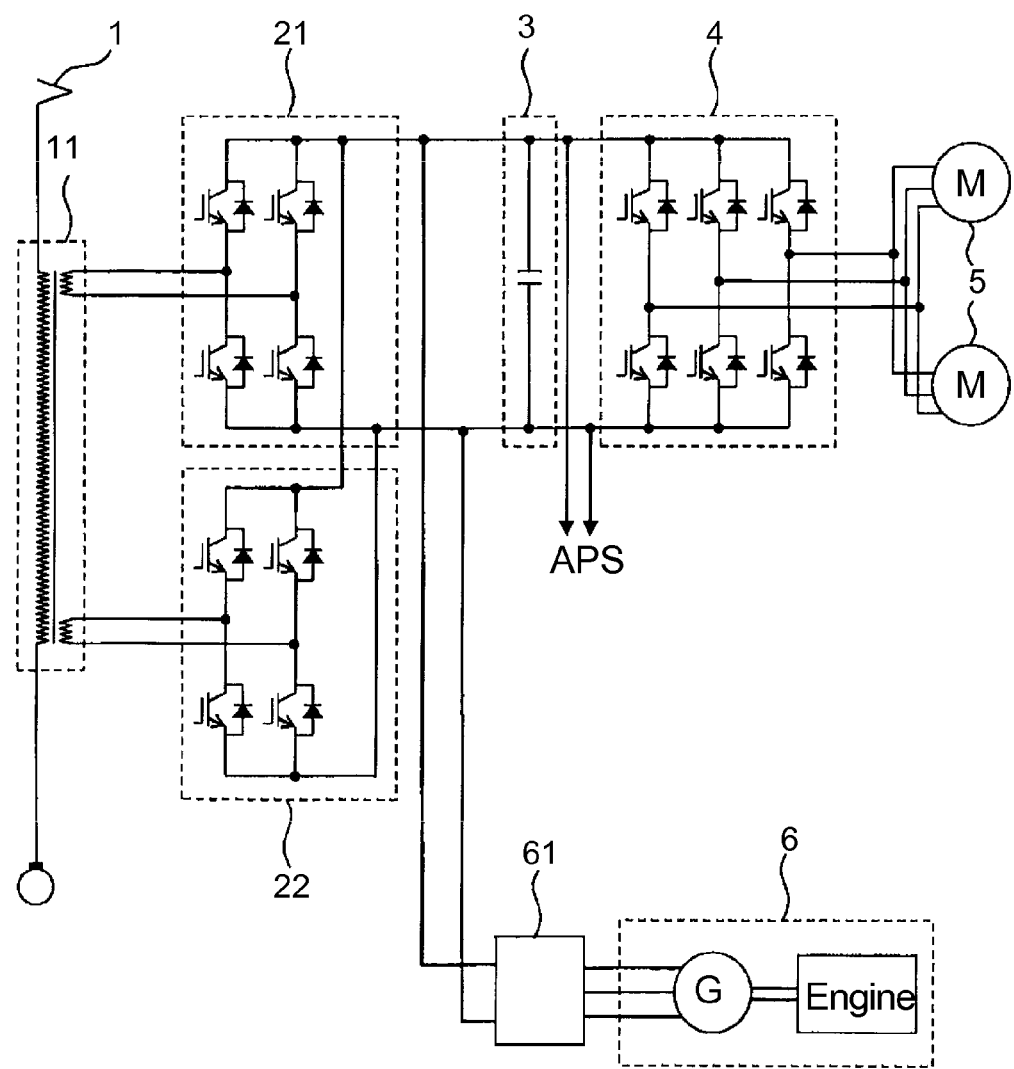
FIG. 6 is a driving system diagram showing an example of the conventional technique.

For comparison, advantageous effects obtained from the present invention will be simply described based on differences from a conventional example shown in FIG. 6. The parts with the same functions as in FIG. 1 are designated with the same numbers, and the parts will not be described here. In the example of FIG. 6, the power conversion circuits 21 and 22 for power supply dedicated to the main transformer 11 and a power conversion circuit 61 for three-phase power supply dedicated to the power generation unit 6 are provided.

On the other hand, in the present invention, the contactors 12 and 13 shown in FIG. 1 are switched according to a change in the power supply (overhead contact line or power generation unit) to standardize the semiconductor elements constituting the power conversion circuits that generate DC power. The power conversion circuits 21 and 22 for power supply are provided with a function of a power conversion circuit for power supply that converts an AC output of the main transformer 11 to a DC voltage, which is their original function, as well as a function of converting a three-phase AC output voltage of the power generation unit 6 to a DC voltage. In this way, the number of power conversion circuits can be reduced to downsize and lighten the driving system.

Figure 4:
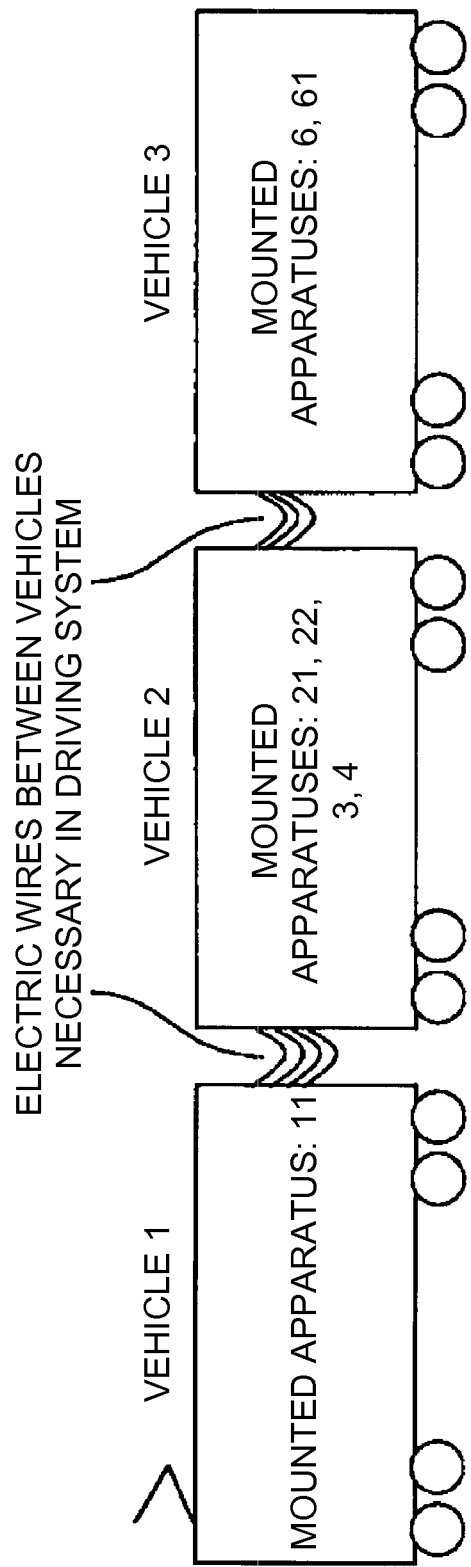
FIG. 4 is a diagram showing a configuration example of a multi-car train applying a conventional technique.
Figure 5:
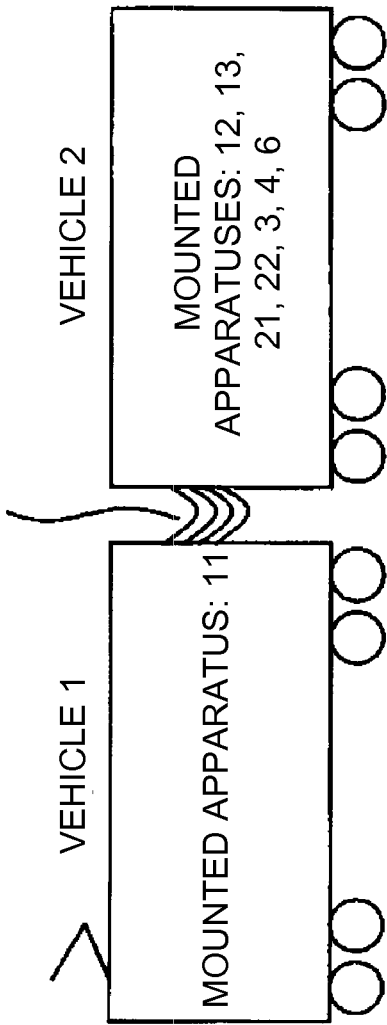
FIG. 5 is a diagram showing a configuration example of a multi-car train applying the present invention.

Advantageous effects of the multi-car train of the present invention will be described with reference to FIGS. 4 and 5. As shown in FIG. 4, in the conventional driving system, due to restrictions in the mounting spaces of the vehicles as well as the volumes and weights of the devices, the main transformer 11, a power conversion device section including the power conversion circuits 21 and 22 for power supply, the smoothing capacitor 3, and the power conversion circuit 4 for drive, and the power generation unit 6 and the power conversion circuit 61 for three-phase power supply need to be mounted on different vehicles. Therefore, the number of electric wires across the vehicles is increased, and there are problems of an increase in the weight caused by the electric wires and an increase in the mounting cost. There is also a problem that the driving system can be applied only to trains with three or more cars.

According to the present invention, the power conversion device section including the power conversion circuits 21 and 22 for power supply, the smoothing capacitor 3, and the power conversion circuit 4 for drive, the power generation unit 6, and the contactors 12 and 13 can be mounted on the same vehicle. Therefore, the number of electric wires across the vehicles can be smaller than that of the conventional system, and this can realize a reduction in the weight of the train, a reduction in the cost, and an increase in the reliability. The minimum number of vehicles is two, and the degree of freedom in forming a multi-car train is increased. For example, when a multi-car train with five cars is necessary, one driving system (three cars) and two vehicles without the driving system are connected to form a multi-car train in the conventional example. In the present invention, one of a multi-car train connecting one driving system (two cars) and three vehicles without the driving system and a multi-car train connecting two driving systems (four cars) and one vehicle without the driving system can be selected according to required driving force, and the degree of freedom in the formation is increased. An advantage of forming a multi-car train by few vehicle types can also be attained. As a result, the degree of freedom is also increased in terms of management and operation of the vehicles, and the maintenance and the operation can be facilitated.

In the operating method when the driving system travels on a non-electrified route shown in FIG. 1, an off command for preventing unnecessary switching is provided to the semiconductor elements constituting the one phase 222, and the semiconductor elements constituting the one phase 221 of the power conversion circuit 22 for power supply and the power conversion circuits for two phases of the power conversion circuit 21 for power supply are appropriately switched in the present embodiment as described above. However, an operating method described below can also be applied as another operating method when the train travels on a non-electrified route. The contactor 12 is opened, and the contactor 13 is closed. An off command is provided to all semiconductor elements constituting the power conversion circuits 21 and 22 for power supply. In this case, the diodes connected in anti-parallel to the semiconductor elements constituting the power conversion circuits 21 and 22 for power supply form diode rectifier circuits. Therefore, the power conversion circuits 21 and 22 for power supply can rectify the three-phase AC voltage that is an output of the power generation unit 6, and the objects of the present invention can also be attained by the operating method.

Whether the train is traveling on an electrified route or a non-electrified route may be determined from a detection result of a pantograph voltage. Alternatively, whether the train is traveling on an electrified route or a non-electrified route may be determined from a result of comparison between a travelling position of the train generated by a tacho-generator or GPS and position information of electrified route stored in advance. Whether the train is traveling on an electrified route or a non-electrified route can also be determined by receiving information of electrified/non-electrified route from a facility on the ground such as a ground member.

Whether the vehicle travels under an overhead contact line (electrified route) and the overhead contact line is in an abnormal state can be determined from a detection result of a pantograph voltage.

It is obvious that the current capacity of the semiconductor elements constituting the power conversion circuits 21 and 22 for power supply is designed according to the larger one of the maximum power when the power supply is obtained from the overhead contact line and the maximum power when the power supply is obtained from the power generation unit 6.

In the example of FIG. 1, the main transformer 11 includes two low-voltage wires for driving system. However, four low-voltage wires may be included to supply power to two driving systems, or six low-voltage wires may be included to supply power to three driving systems. Alternatively, the number of low-voltage wires may be further increased to supply power to four or more driving systems.

Although the first embodiment illustrates an example of supplying power to one driving system from two low-voltage wires, the present invention is not limited to this, and the number of low-voltage wires may be three or more. The number of power generation units that supply power to one driving system does not have to be one, and two or more power generation units may be connected. In this way, when a large number of low-voltage wires or power generation units supply power in the driving system, the power conversion circuits 21 and 22 for power supply includes at least AC input ends, the number of which corresponds to the number of phases of the AC power supply with the maximum number of phases among the plurality of different AC power supplies. The semiconductor elements are operated according to the AC power of the AC power supply connected by the contactor, and the AC power is converted to DC power.

[Second Embodiment]

Figure 2:
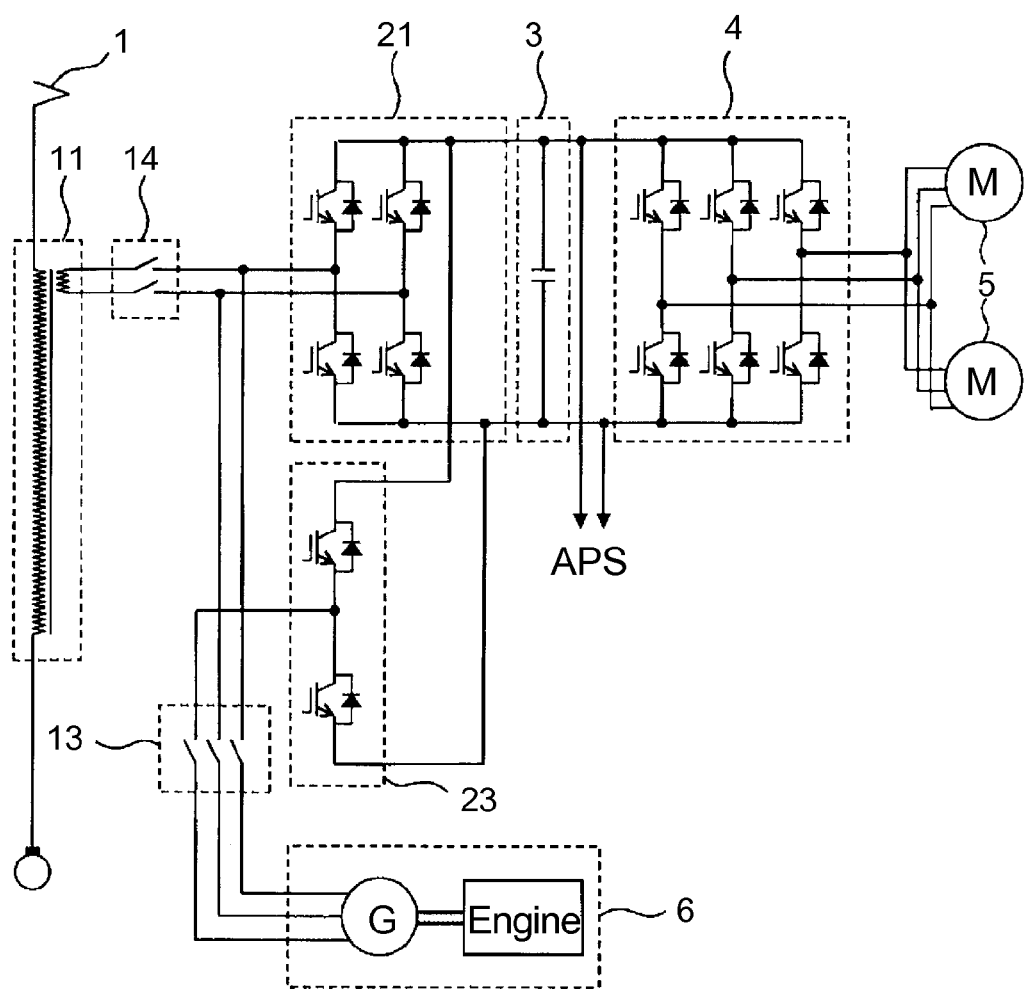
FIG. 2 is a driving system diagram showing an embodiment of the present invention.

Another embodiment will be described with reference to FIG. 2. FIG. 2 illustrates an example when one driving system is connected to one wire on the low pressure side of the main transformer 11. In the example of FIG. 2, the power conversion circuit 21 for power supply is connected to one wire on the low pressure side of the main transformer 11, and a contactor 14 is connected between the one wire on the low pressure side and the power conversion circuit 21 for power supply. More specifically, the contactor 14 for one phase (two phases) type is connected, in place of the contactor 12 in FIG. 1. A power conversion circuit 23 for power supply for one phase of the power conversion circuit is further included, in place of the power conversion circuit 22 for power supply in FIG. 1. More specifically, two phases of the three-phase alternating current supplied from the power generation unit 6 is connected to the AC side of the power conversion circuit 21 for power supply, and the remaining one phase is connected to the AC side of the power conversion circuit 23 for power supply. The configuration and operation of other parts are the same as in the first embodiment.

In the example of FIG. 2, the contactor 14 is closed, and the contactor 13 is opened under the overhead contact line, that is, in the electrified route. The overhead contact line serves as a power supply, and the semiconductor elements constituting the power conversion circuit 21 for power supply are appropriately switched to convert the single-phase alternating current to a direct current to obtain a DC voltage. The conversion circuit 4 for driving electric motor drives the main electric motor 5. In this case, an off command is provided to the semiconductor elements constituting the power conversion circuit 23 for power supply to prevent unnecessary switching.

On the other hand, the contactor 14 is opened, and the contactor 13 is closed in a route without the overhead contact line, that is, in the non-electrified route. The semiconductor elements constituting the power conversion circuit 21 for power supply and the power conversion circuit 23 for power supply for one phase are appropriately switched to convert the three-phase alternating current to a direct current, and the three-phase AC output of the power generation unit 6 is converted to a direct current.

Therefore, as in the first embodiment, the power conversion circuit necessary to obtain power from the overhead contact line and the power conversion circuit necessary to obtain power from the power generation unit 6 do not have to be separately provided, and the driving system can be downsized and lightened.

In the operating method of the driving system in the non-electrified route shown in FIG. 2, the semiconductor elements constituting the power conversion circuit 22 for power supply and the power conversion circuit 23 for power supply are appropriately switched in the present embodiment as described above. However, an operating method described below can also be applied as another operating method in the non-electrified route. In the non-electrified route, the contactor 14 is opened, and the contactor 13 is closed. An off command is provided to all of the plurality of semiconductor elements constituting the power conversion circuits 21 and 23 for power supply. In this case, the diodes connected in anti-parallel to the semiconductor elements constitute diode rectifier circuits. Therefore, the three-phase AC voltage as an output of the power generation unit 6 can be rectified, and the objects of the present invention can also be attained by this operating method.

[Third Embodiment]

Figure 3:
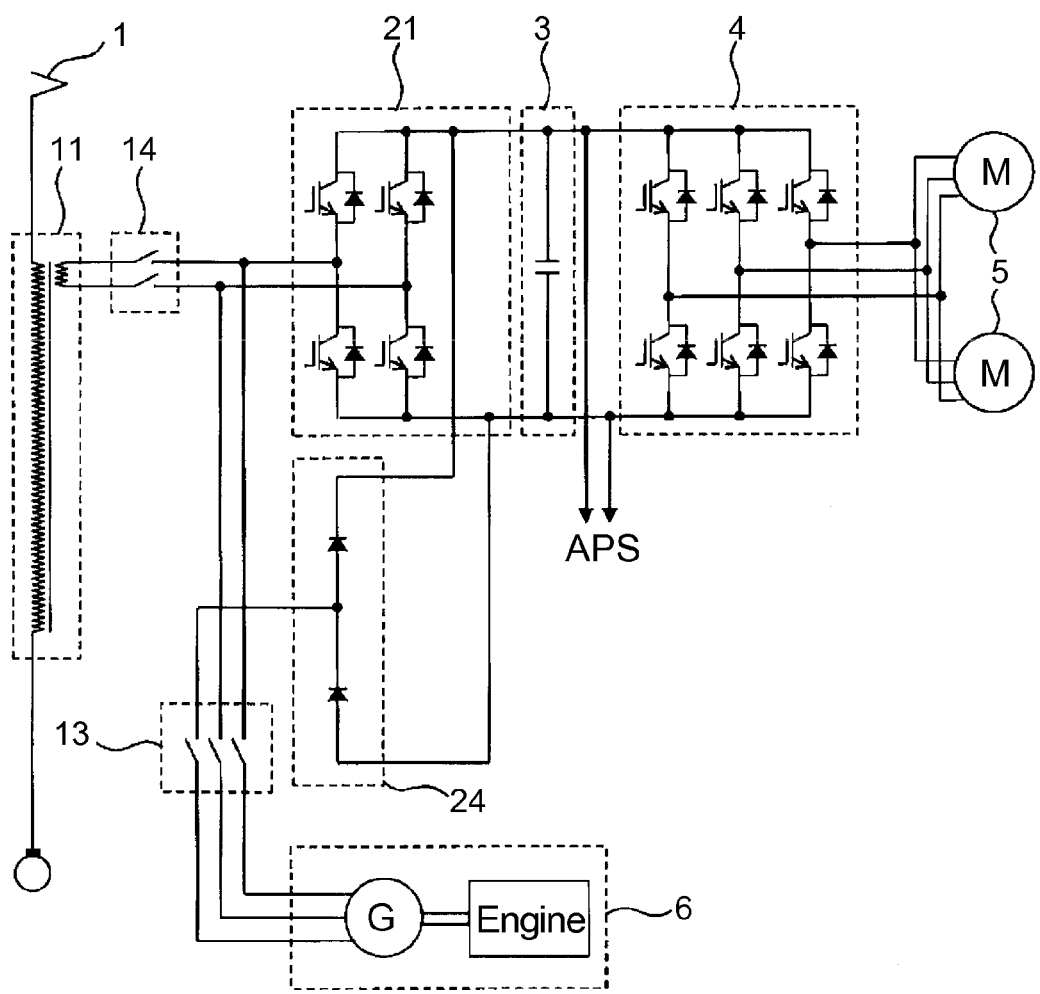
FIG. 3 is a driving system diagram showing an embodiment of the present invention.

Next, another embodiment will be described with reference to FIG. 3. FIG. 3 is an embodiment when one driving system is connected to one wire on the low pressure side of the main transformer 11 and is an embodiment different from FIG. 2.

In FIG. 3, a power conversion circuit 24 made of diodes is applied in place of the power conversion circuit 23 for one phase of the embodiment shown in FIG. 2. The configuration of other parts is the same as in the first and second embodiments.

In the example of FIG. 3, the contactor 14 is closed, and the contactor 13 is opened under the overhead contact line, that is, in the electrified route. The overhead contact line serves as a power supply, and the semiconductor elements constituting the power conversion circuit 21 for power supply are appropriately switched to convert the single-phase alternating current to a direct current to obtain a DC voltage. The conversion circuit 4 for driving electric motor drives the main electric motor 5.

On the other hand, the contactor 14 is opened, and the contactor 13 is closed in a route without the overhead contact line, that is, in the non-electrified route. An off command is provided to the semiconductor elements constituting the power conversion circuit 21 for power supply. The diodes constituting the power conversion circuits 21 for power supply and the rectifier circuit constituted by the power conversion circuit 24 rectify the three-phase AC output of the power generation unit 6 to a direct current.

As a result, in the non-electrified route, the power conversion circuit 21 for power supply and the power conversion circuit 24 as a diode rectifier circuit can obtain a direct current from the three-phase AC output of the power generation unit 6. Compared to FIG. 2, further downsizing and lightening of the devices can be expected in the example of FIG. 3.

In the second and third embodiments shown in FIGS. 2 and 3, the current capacity of the semiconductor elements constituting the power conversion circuit 21 for power supply is designed according to the larger one of the maximum power when the power supply is obtained from the overhead contact line and the maximum power when the power supply is obtained from the power generation unit 6. The current capacity of the semiconductor elements constituting the power conversion circuit 23 for power supply and the diodes constituting the power conversion circuit 24 is designated according to the maximum power when the power supply is obtained from the power generation unit 6.

If the maximum power when power is obtained from the on-board power generation unit 6 is smaller than the maximum power when power is obtained from the overhead contact line, the current capacity of the semiconductor elements constituting the power conversion circuit 23 for power supply or the diodes constituting the power conversion circuit 24 and the cooling capacity of the cooling device can be smaller than those of the power conversion circuit 21 for power supply. Further downsizing and lightening can be expected.

Although only the smoothing capacitor 3 is illustrated on the DC side of the power conversion circuits (21, 22, 23, 24, and 4) in the embodiments described in FIGS. 1 to 3, the advantageous effects of the present invention are not affected even if a filter circuit that removes rectification ripples associated with the rectification of the AC power supply is connected. Obviously, the advantageous effects of the present invention can be attained even if an auxiliary power supply APS that supplies power to on-board electrical apparatuses (for example, a lighting apparatus and an air conditioner) is connected to the smoothing capacitor 3, with the smoothing capacitor 3 serving as a voltage source. The advantageous effects of the present invention are not affected regardless of whether the contactors (12, 13, and 14) in the examples of FIGS. 1 to 3 are contact types (conduction state is switched by on and off commands) or semiconductor types.

The second and third embodiments shown in FIGS. 2 and 3 illustrate examples in which the main transformer 11 includes one low-voltage wire for driving system. However, two or more low-voltage wires may be provided to supply power to two or more driving systems.

The power generation unit 6 including the engine and the power generator and the overhead contact line are illustrated as examples of a plurality of power supplies in the embodiments. However, the power supplies are not limited to these. Another power supply that generates AC power can replace the power supplies, or another power supply that generates AC power can be additionally connected. In that case, if the other power supply is a three-phase AC power supply, the power supply is connected to the power conversion circuit, like the power generation unit 6 in the embodiments. If the other power supply is a single-phase AC power supply, the power supply is connected to the power conversion circuit, like the main transformer 11 in the embodiments.

A plurality of railroad-vehicles mounted with the driving systems described in the embodiments described above can be connected to form a multi-car train mounted with a plurality of driving systems. A railroad-vehicle mounted with one driving system described in the embodiments and a railroad-vehicle not mounted with the driving system can also be connected to form a multi-car train mounted with one driving system.

[Fourth Embodiment]

An embodiment of applying the driving system described in the first to third embodiments to a multi-car train in which a plurality of vehicles are connected will be described with reference to FIGS. 7, 8, and 9.

Figure 7:
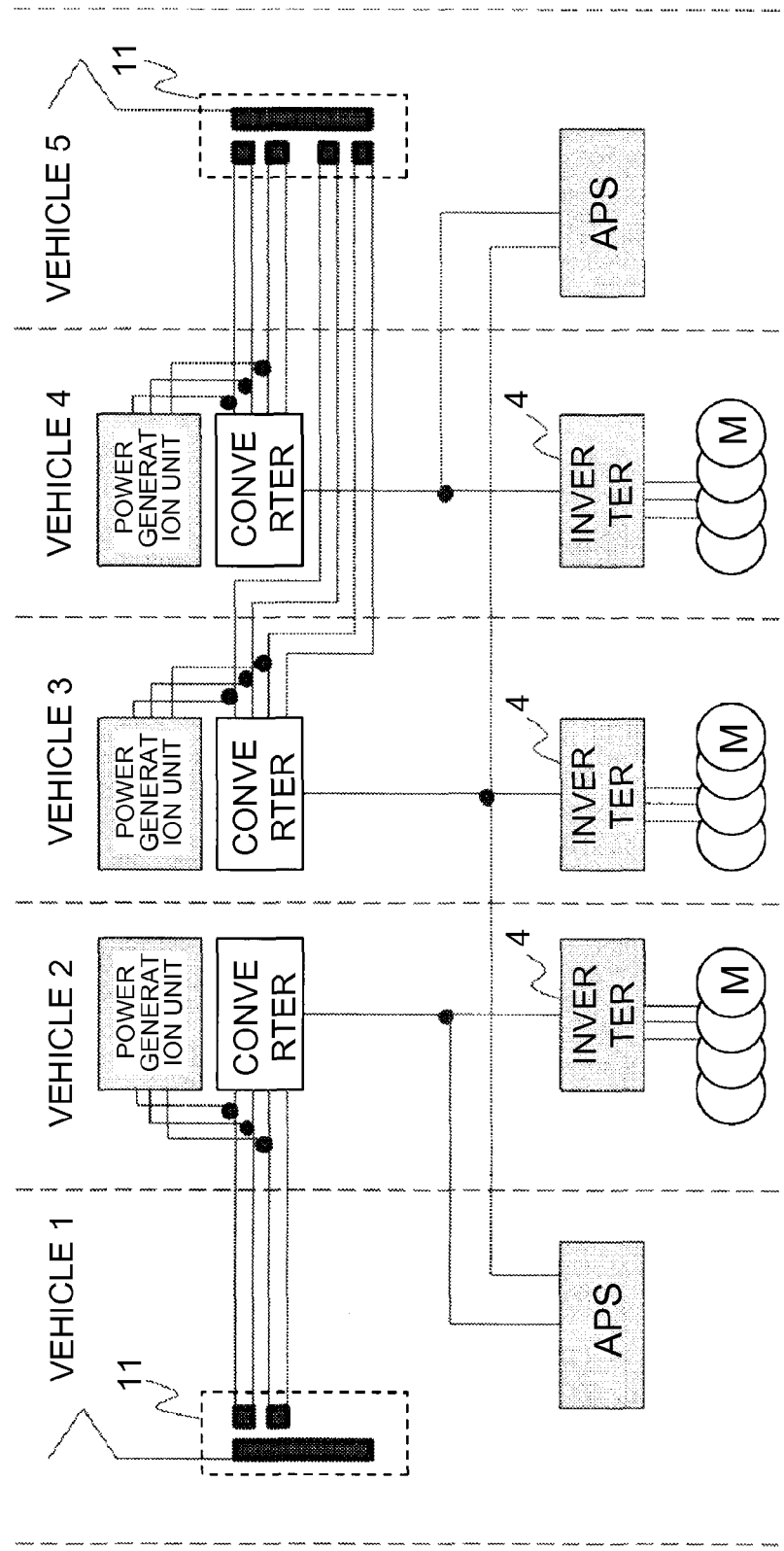
FIG. 7 is a diagram showing a configuration example when the present invention is applied to a five-car train.

In FIG. 7, five vehicles 1 to 5 form a multi-car train. Each of the vehicles 2, 3, and 4 is mounted with the power generation unit 6 constituted by the engine and the power generator, the converters constituted by the power conversion circuits 21 and 22 for power supply, the main electric motor 5, the conversion circuit 4 for driving electric motor, and the contactors 12 and 13. When the contactor 12 is connected, the converters convert the single-phase AC power supplied from the main transformer 11 to DC power to supply the DC power to the conversion circuit 4 for driving electric motor. The converters mounted on the vehicle 2 are connected, through the contactor 12, to two wires on the low pressure side of the main transformer 11 mounted on the vehicle 1. The converters mounted on the vehicles 3 and 4 are connected, through the contactor 12, to two wires on the low pressure side of the main transformer 11 mounted on the vehicle 5.

As described in the first embodiment, FIG. 7 illustrates an example in which one driving system is connected to two wires on the low pressure side of the main transformer 11, and the converters constituted by the power conversion circuits 21 and 22 for power supply are mounted. However, when one driving system is connected to one wire on the low pressure side of the main transformer 11, the converters can be constituted by the power conversion circuit 21 for power supply and the one phase 23 of the power conversion circuit for power supply as in the second embodiment, or the converters can be constituted by the power conversion circuit 21 for power supply and the power conversion circuit 24 made of diodes as in the third embodiment.

The vehicles 1 and 5 are mounted with the power collector 1, the main transformer 11, and the auxiliary power supply APS. The auxiliary power supplies APS, connected to the DC sides of a plurality of converters mounted on a plurality of driving vehicles, convert the DC power supplied from the converters to AC power at a commercial frequency or to DC power at a lower pressure than the DC power of the main circuit and supply the power to auxiliary apparatuses, such as lighting apparatuses and air conditioners, mounted on the vehicles 1 to 5 of the multi-car train. The auxiliary power supply APS includes selection means that can select a connection point to allow connection with one of the DC sides of the plurality of converters, and even if there is an abnormality in part of the converters, the DC power can be supplied from the other converters.

Figure 8:
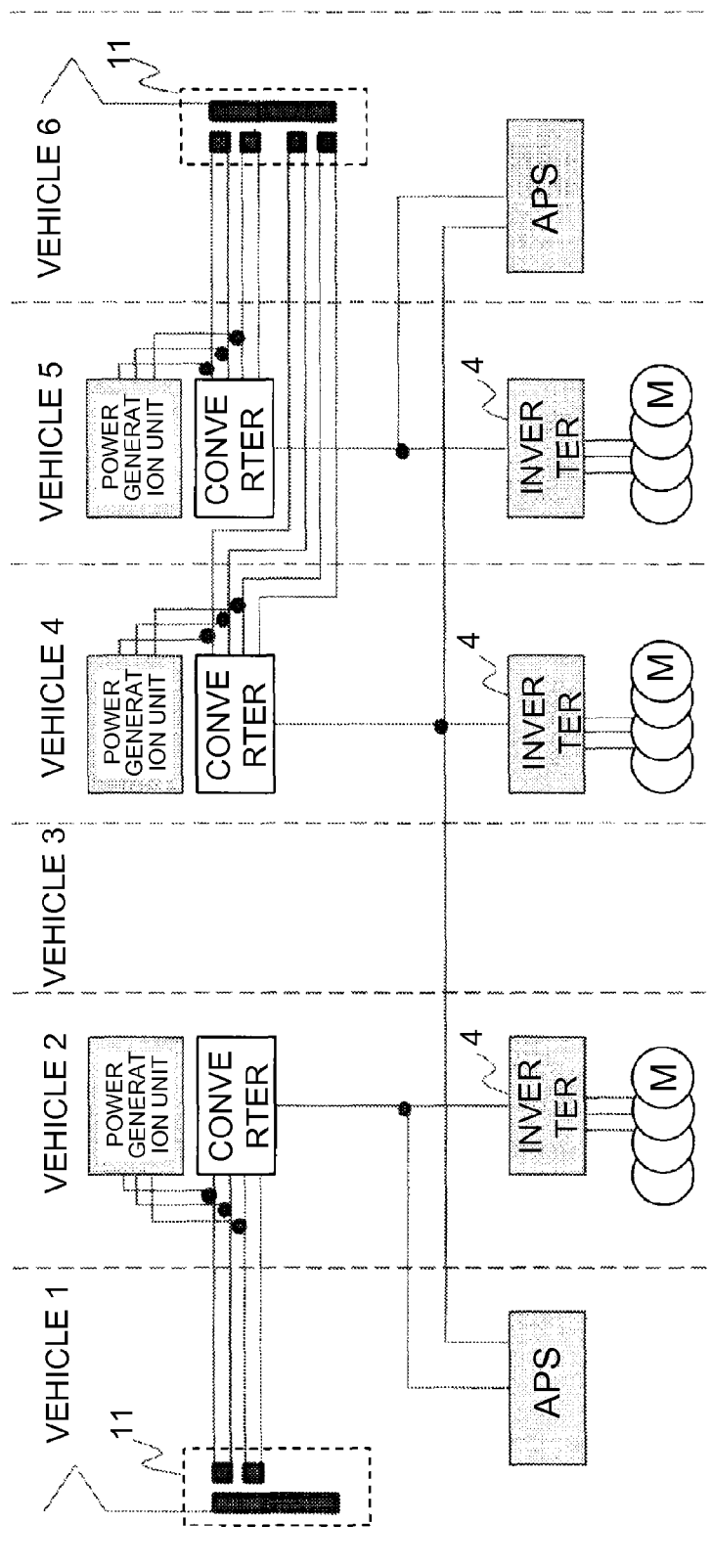
FIG. 8 is a diagram showing a configuration example when the present invention is applied to a six-car train.

FIG. 8 shows a configuration in which a vehicle without any of the power generation units, the converters, the inverters, the electric motors, and the main transformers is added as a vehicle 3 to the multi-car train shown in FIG. 7. In this way, one or more non-driving vehicles can be appropriately added according to the necessary traffic volume.

Figure 9:
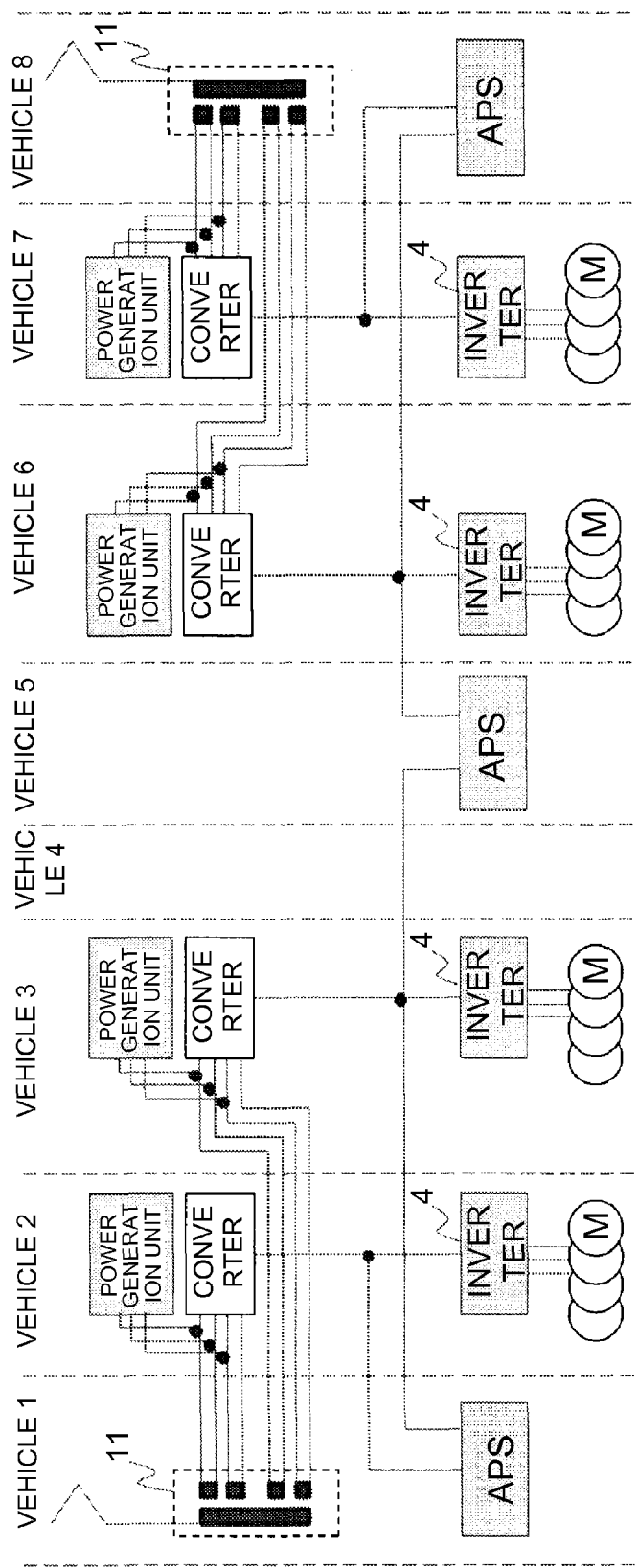
FIG. 9 is a diagram showing a configuration example when the present invention is applied to an eight-car train.

In FIG. 9, a multi-car train includes eight vehicles 1 to 8. Each of the vehicles 2, 3, 6, and 7 is mounted with the power generation unit 6 constituted by the engine and the power generator, the converters constituted by the power conversion circuits 21 and 22 for power supply, the main electric motor 5, and the conversion circuit 4 for driving electric motor. The converters convert the AC power supplied from the main transformer 11 or the power generation unit 6 to DC power to supply the DC power to the conversion circuit 4 for driving electric motor. The converters mounted on the vehicles 2 and 3 are connected to two wires on the low pressure side of the main transformer 11 mounted on the vehicle 1, and the converters mounted on the vehicles 6 and 7 are connected to two wires on the low pressure side of the main transformer 11 mounted on the vehicle 8.

As described in the first embodiment, FIG. 9 illustrates an example in which one driving system is connected to two wires on the low pressure side of the main transformer 11, and the converters constituted by the power conversion circuits 21 and 22 for power supply are mounted. However, when one driving system is connected to one wire on the low pressure side of the main transformer 11, the converters can be constituted by the power conversion circuit 21 for power supply and the one phase 23 of the power conversion circuit for power supply as in the second embodiment, or the converters can be constituted by the power conversion circuit 21 for power supply and the power conversion circuit 24 made of diodes as in the third embodiment.

The power collector 1, the main transformer 11, and the auxiliary power supply APS are mounted on the vehicles 1 and 8 at both ends, and the auxiliary power supply APS is mounted on the vehicle 5. The vehicle 4 is a vehicle without the auxiliary power supply APS, the main transformer 11, the power generation unit, the electric motor, and the like. The auxiliary power supplies APS mounted on the vehicles 1, 5, and 8 are connected to the DC sides of a plurality of converters mounted on a plurality of driving vehicles. The auxiliary power supplies APS convert the DC power supplied from the converters to AC power at a commercial frequency or to DC power at a lower pressure than the DC power of the main circuit and supply the power to auxiliary apparatuses, such as lighting apparatuses and air conditioners, mounted on the vehicles 1 to 8 of the multi-car train. The auxiliary power supply APS includes selection means that can select a connection point to allow connection with one of the DC sides of the plurality of converters, and even if there is an abnormality in part of the converters, the DC power can be supplied from the other converters.

Figure 10:
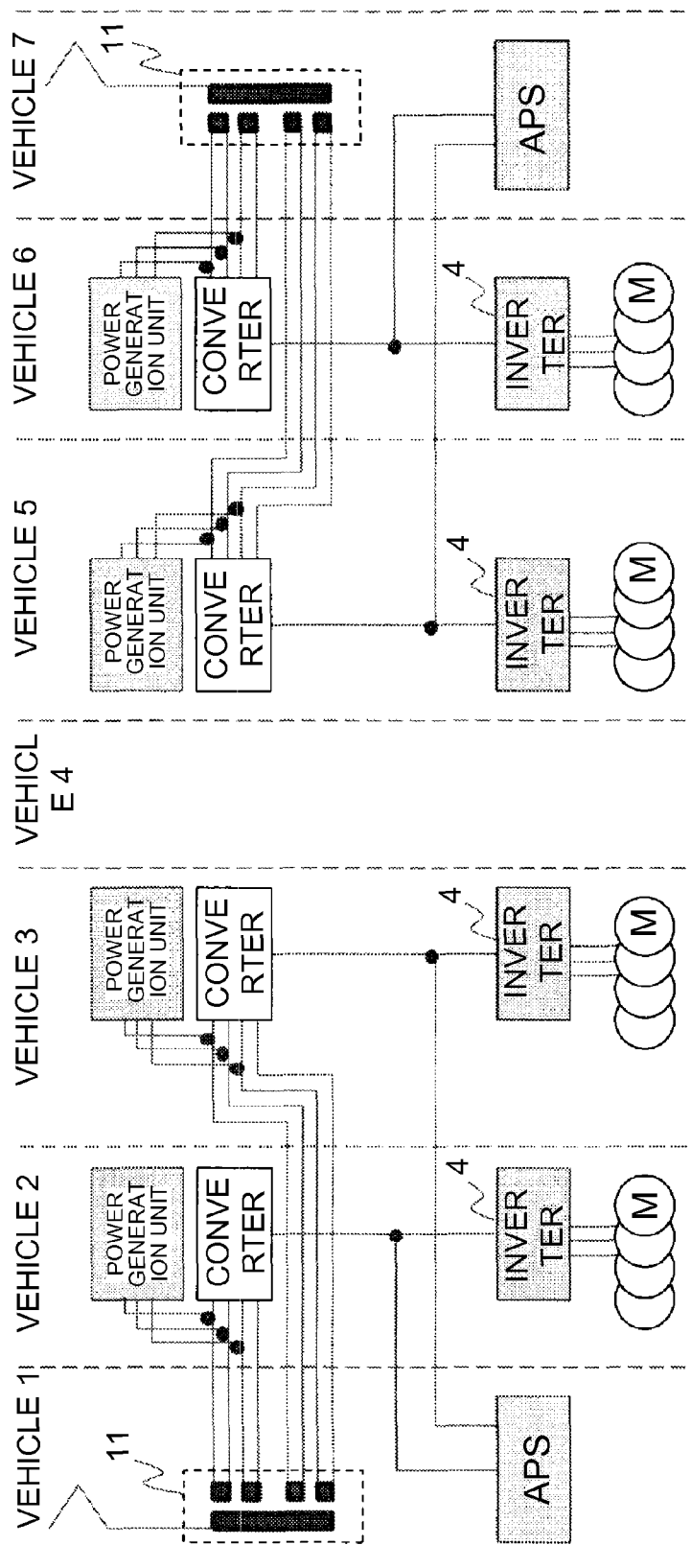
FIG. 10 is a diagram showing a configuration example when the present invention is applied to a seven-car train.

FIG. 10 is an example of removing the vehicle 5 as a non-driving vehicle mounted with the auxiliary power supply APS from the multi-car train shown in FIG. 9 to form a seven-car train. In this way, the total number of vehicles, the number of auxiliary power supplies APS, and the number of vehicles and driving vehicles mounted with the electric motors can be appropriately adjusted according to the necessary traffic volume or the power and driving force of the auxiliary power supply.

Figure 11:
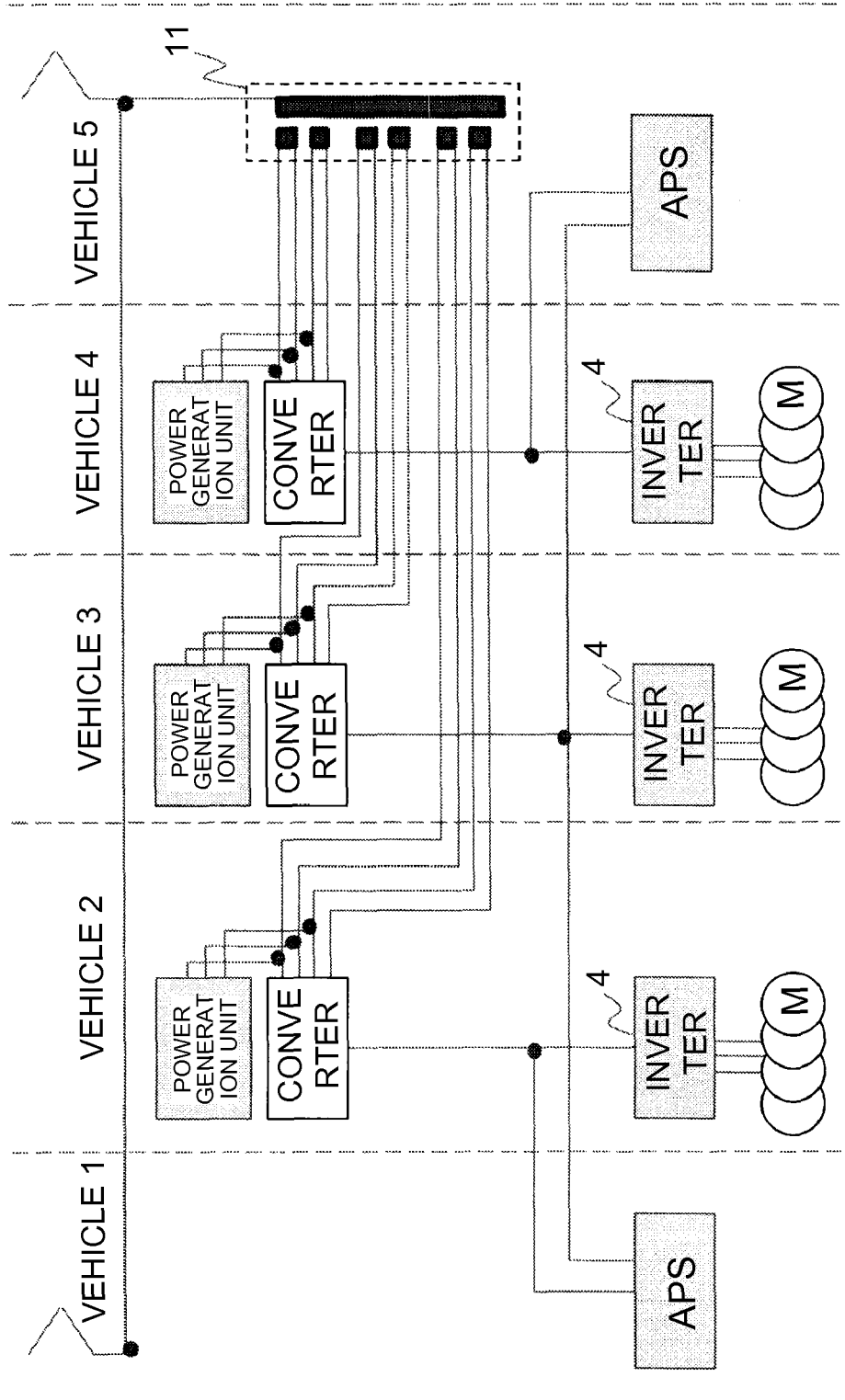
FIG. 11 is a diagram showing another configuration example when the present invention is applied to a five-car train.

In FIG. 11, a multi-car train includes five vehicles 1 to 5. The center vehicles 2, 3, and 4 are mounted with the power generation units, the converters, the inverters, and the electric motors, and the vehicles 1 and 5 at both ends are not mounted with the electric motors and the like. Each of the vehicles 2, 3, and 4 is mounted with the power generation unit 6 constituted by the engine and the power generator, the converters constituted by the power conversion circuits 21 and 22 for power supply, the main electric motor 5, and the conversion circuit 4 for driving electric motor, and the converters convert the AC power supplied from the main transformer to DC power to supply the DC power to the conversion circuit 4 for driving electric motor. The converters mounted on the vehicles 2, 3, and 4 are connected to two wires on the low pressure side of the main transformer 11 mounted on the vehicle 5.

As described in the first embodiment, FIG. 11 illustrates an example in which one driving system is connected to two wires on the low pressure side of the main transformer 11, and the converters constituted by the power conversion circuits 21 and 22 for power supply are mounted. However, when one driving system is connected to one wire on the low pressure side of the main transformer 11, the converters can be constituted by the power conversion circuit 21 for power supply and the one phase 23 of the power conversion circuit for power supply as in the second embodiment, or the converters can be constituted by the power conversion circuit 21 for power supply and the power conversion circuit 24 made of diodes as in the third embodiment.

The power collector 1, the main transformer 11, and the auxiliary power supply APS are mounted on the vehicle 5. The main transformer 11 includes six wires on the low pressure side to supply power to the converters mounted on the vehicles 2, 3, and 4, and two wires are connected to each converter. The power collector 1 and the auxiliary power supply APS are mounted on the vehicle 1, and the power collector of the vehicle 1 is connected to the main transformer of the vehicle 5 through an electric wire. The auxiliary power supplies APS mounted on the vehicles 1 and 5 are connected to the DC sides of a plurality of converters mounted on a plurality of driving vehicles. The auxiliary power supplies APS convert the DC power supplied from the converters to AC power at a commercial frequency or to DC power at a lower pressure than the DC power of the main circuit and supply the power to auxiliary apparatuses, such as lighting apparatuses and air conditioners, mounted on the vehicles 1 to 5 of the multi-car train. The auxiliary power supply APS includes selection means that can select a connection point to allow connection with one of the DC sides of the plurality of converters, and even if there is an abnormality in part of the converters, the DC power can be supplied from the other converters.

Although FIG. 11 illustrates an example in which the devices constituting the driving system for generating driving force are dispersed and arranged on the vehicles 2 to 5, one or more non-driving vehicles not mounted with the devices constituting the driving system (power generation units, converters, inverters, electric motors, transformers, and power collectors) can be appropriately added according to the necessary traffic volume.

Figure 12:
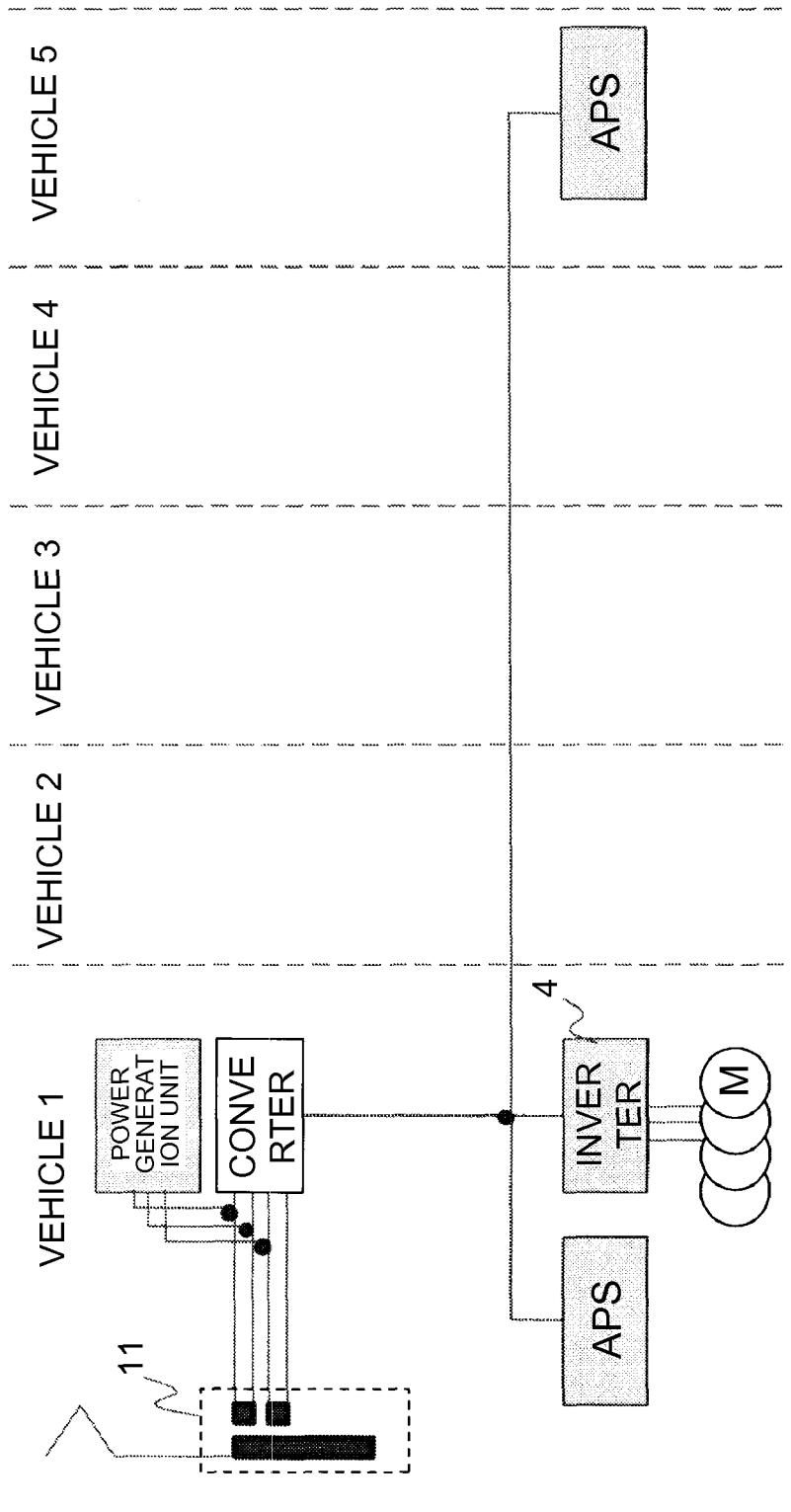
FIG. 12 is a diagram showing another configuration example when the present invention is applied to a five-car train.

FIGS. 7 to 11 have illustrated examples in which the devices constituting the driving system are dispersed and arranged on a plurality of vehicles. However, when the present invention is applied to a multi-car train in which the required maximum drive output is not large because the train is operated at a relatively low speed, the weight of the driving system is not large. Therefore, the devices constituting the driving systems (pantograph, main transformer, power generation unit, converter, inverter, and electric motor) can be concentrated and mounted on one vehicle as shown in FIG. 12. When the allowable vehicle weight is large in the track because the track has resistance to damage, the devices constituting the driving system can be similarly concentrated and mounted on one vehicle. In this way, when the devices constituting the driving system are concentrated and mounted on one vehicle, there is an advantage that the number of electrical wires between the devices constituting the driving system can be reduced.

A locomotive is provided with a large number of apparatuses to obtain driving force for driving a multi-car train, and the weight of the locomotive is usually several times higher than the weight of a passenger car constituting the train. For example, compared to a power-dispersed train, such as a Shinkansen train travelling in Japan, in which a driving device and other functions necessary for the train are dispersed, the locomotive has a problem that the track is significantly damaged by a heavy axle or has a problem that there is a limit to speeding up the train because a large-capacity brake device is necessary for a vehicle with concentrated weight. Therefore, it is desirable to disperse the apparatuses constituting the driving system, such as the power generation unit, the converter, the conversion circuit 4 for driving electric motor, and the electric motor, to a plurality of vehicles as described in FIGS. 7 to 11.

However, when the apparatuses are dispersed and arranged on a plurality of vehicles, converters that convert AC power generated by the power generation units to DC power are necessary, and the number of converters increases. There are problems of an increase in the weight of the driving system, an increase in the cost, and complication of the maintenance. Therefore, as described in the present embodiment, the driving systems described in the first to third embodiments can be used in the multi-car train in which the apparatuses are dispersed and arranged on a plurality of driving vehicles. This can reduce an increase in the number of converters and can prevent the problems of an increase in the weight of the driving system, an increase in the cost, and complication of the maintenance.

According to the present embodiment, the number of converters can be reduced. Therefore, the power generation unit 6, the converters, the conversion circuit 4 for driving electric motor, and the main electric motor 5 necessary for the drive can be mounted on one vehicle, and the number of electric wires for supplying drive power across the vehicles can be reduced. Other apparatuses, such as the main transformer 11 and the auxiliary power supply APS, can be mounted on other vehicles to prevent an increase in the weight of a specific vehicle caused by unbalanced weight between vehicles, and damage to the track can be reduced.

Reference Signs List
1 Power collector
3 DC filter capacitor
4 Conversion circuit for driving electric motor (Inverter circuit for driving motor)
5 Main electric motor
6 Power generation unit
11 Main transformer
12, 13, 14 Contactor
21, 22 Power conversion circuit for power supply
23 One phase of power conversion circuit for power supply
24 Power conversion circuit made of diodes
61 power conversion circuit for three-phase power supply
221, 222 One phase of conversion circuit constituting power conversion circuit 22 for power supply

The invention claimed is:
1. A driving system comprising:
a first power conversion device that converts AC power to DC power; and
a second power conversion device that drives an electric motor by using the DC power converted by the first power conversion device as a power supply; and
a plurality of AC power supplies that supply AC power with different numbers of phases, comprising:
a pantograph that collects single-phase AC power from an overhead contact line connected to a single-phase AC power supply;

a main transformer that steps down the collected single-phase AC power; and a power generation unit that comprises an engine and a three-phase AC power generator to output three-phase AC power, wherein the first power conversion device is connected to the plurality of AC power supplies that supply AC power with different numbers of phases, the driving system further comprises switching means, connected between the plurality of AC power supplies and the first power conversion device, for connecting part of the plurality of AC power supplies to the first power conversion device, wherein the switching means connects an AC side of the first power conversion device to one of a wire on a low pressure side of the main transformer and an output of the power generation unit, and opens the other, and the first power conversion device performs an operation of converting AC power supplied by at least one of the plurality of AC power supplies connected by the switching means to DC power according to a number of phases of the AC power supplied by the at least one of the plurality of AC power supplies.

2. The driving system according to claim 1, wherein the switching means can electrically connect an AC side of the first power conversion device to one of a single-phase AC power supply that supplies a single-phase alternating current and a three-phase AC power supply that supplies a three-phase alternating current, the first power conversion device comprises power conversion circuits for four phases comprising two connectors connected in series, the connectors comprising semiconductor elements and diodes with self-extinction capability connected in antiparallel, the first power conversion device being connected to the single-phase AC power supply through the power conversion circuits for four phases and connected to the three-phase AC power supply through the power conversion circuits for three phases among the power conversion circuits for four phases, and switching control of the power conversion circuits connected to the AC power supply selected by the switching means is performed according to the number of phases of AC power supplied from the AC power supply.

3. A multi-car train having the driving system according to claim 1 mounted across a plurality of railroad-vehicles and formed by connecting the plurality of railroad-vehicles, wherein the multi-car train is formed by connecting the plurality of railroad-vehicles mounted with the driving system and a railroad-vehicle not mounted with the driving system.

4. The driving system according to claim 1, wherein a plurality of wires are arranged on the low pressure side of the main transformer, the first power conversion device comprises power conversion circuits for four phases comprising two connectors connected in series, the connectors comprising semiconductor elements and diodes with self-extinction capability connected in antiparallel, two phases of the power conversion circuits being connected to one of the plurality of wires through the switching means, the other two phases of the power conversion circuits being connected to the other of the plurality of wires through the switching means, the switching means connects two wires on the low pressure side of the main transformer to the power conversion circuits for four phases to supply single-phase AC power to the first power conversion device when a vehicle travels on an overhead contact line installation route, and the switching means connects a three-phase AC output of the power generation unit to the power conversion circuits for three phases to supply three-phase AC power output from the power generation unit to the first power conversion device when the vehicle travels on a route without an overhead contact line or on an overhead contact line route in an abnormal state.

5. The driving system according to claim 4, wherein when the vehicle travels on the route without an overhead contact line or on the overhead contact line route in an abnormal state, the switching means operates the semiconductor elements constituting the power conversion circuits for three phases connected to the power generation unit to convert input three-phase AC power to DC power and maintains a non-conductive state of the semiconductor element constituting the power conversion circuit for the remaining one phase.

6. The driving system according to claim 4, wherein when the vehicle travels on the route without an overhead contact line or on the overhead contact line route in an abnormal state, the switching means supplies three-phase AC power to the power conversion circuits for three phases connected to the power generation unit, all of the semiconductor elements constituting the first power conversion device are maintained in the non-conductive state, and the diodes connected in antiparallel to the semiconductor elements rectify the three-phase AC power output from the power generation unit to obtain DC power.

7. The driving system according to claim 1, wherein the first power conversion device comprises a power conversion circuit for each of the three phases, the power conversion circuits comprising two connectors connected in series, the connectors comprising semiconductor elements and diodes with self-extinction capability connected in antiparallel, the power conversion circuits of two phases are connected to wires on the low pressure side of the main transformer through the switching means, the switching means connects the wires on the low pressure side of the main transformer to the power conversion circuits for two phases to supply single-phase AC power to the first power conversion device when the vehicle travels on an overhead contact line installation route, and the switching means connects the three-phase AC output of the power generation unit to the power conversion circuits for three phases to supply three-phase AC power output from the power generation unit to the first power conversion device when the vehicle travels on the route without an overhead contact line or on the overhead contact line route in an abnormal state.

8. The driving system according to claim 7, wherein when the vehicle travels on an overhead contact line installation route, the semiconductor element constituting the power conversion circuit for one phase not connected to the wires through the switching means among the three phases of the power conversion circuits is maintained in the non-conductive state.

9. The driving system according to claim 7, wherein the power conversion circuits for two phases connectable to the wires and to the power generation unit through the switching means have a current capacity according to a larger one of maximum power supplied from the main transformer and maximum power supplied from the power generation unit.

10. The driving system according to claim 7, wherein
the power conversion circuit for one phase is not connected to the wires and connectable to the power generation unit through the switching means has a current capacity according to the maximum power of the power generation unit.

11. The driving system according to claim 1, wherein
the first power conversion device comprises: power conversion circuits for two phases comprising two connectors connected in series, the connectors comprising semiconductor elements and diodes with self-extinction capability connected in antiparallel; and a rectifier circuit for one phase comprising two diodes connected in series,
two phases of the power conversion circuits are connected to wires on the low pressure side of the main transformer through the switching means,
the switching means connects the wires on the low pressure side of the main transformer to the power conversion circuits for two phases to supply single-phase AC power to the first power conversion device when the vehicle travels on the overhead contact line installation route, and
the switching means connects the three-phase AC output of the power generation unit to the power conversion circuits for two phases and to the rectifier circuit for one phase to supply three-phase AC power output from the power generation unit to the first power conversion device when the vehicle travels on a route without the overhead contact line or on the overhead contact line route in an abnormal state.

12. The driving system according to claim 11, wherein
when the vehicle travels on a route without the overhead contact line or on the overhead contact line route in an abnormal state, the switching means supplies three-phase AC power to the power conversion circuits for two phases connected to the power generation unit and supplies three-phase AC power to the rectifier circuit for one phase, all of the semiconductor elements constituting the power conversion circuits for two phases are maintained in the non-conductive state, and the diodes connected in antiparallel to the semiconductor elements and the rectifier circuit for one phase rectify the three-phase AC power output from the power generation unit to obtain DC power.

13. The driving system according to claim 11, wherein
the power conversion circuits for two phases connectable to the wires and to the power generation unit through the switching means have a current capacity according to a larger one of maximum power supplied from the main transformer and maximum power supplied from the power generation unit.

14. The driving system according to claim 11, wherein
the rectifier circuit for one phase not connected to the wires and connectable to the power generation unit through the switching means has a current capacity according to the maximum power of the power generation unit.

15. The driving system according to claim 1, wherein
an auxiliary power supply that supplies power to an on-board electrical apparatus is connected to a DC side of the first power conversion device, and DC power from the first power conversion device is supplied to the auxiliary power supply.

16. A multi-car train comprising the driving system according to claim 1 and formed by connecting a plurality of railroad-vehicles, the plurality of railroad-vehicles comprising:
a first railroad-vehicle comprising the pantograph and the main transformer; and
a second railroad-vehicle comprising the power generation unit, the first power conversion device, the electric motor, and the second power conversion device.

17. The multi-car train according to claim 16, comprising:
at least one or more first railroad-vehicles; and
at least two or more second railroad-vehicles.

18. The multi-car train according to claim 17, further comprising,
in addition to the first railroad-vehicles and the second railroad-vehicles, a third railroad-vehicle not mounted with any of the pantograph, the main transformer, the power generation unit, the first power conversion device, the electric motor, and the second power conversion device, wherein
the multi-car train is formed by connecting the first railroad-vehicles, the second railroad-vehicles, and the third railroad-vehicle.

19. The multi-car train according to claim 17, wherein
the first railroad-vehicle comprises an auxiliary power supply that is connected to a DC section of the first power conversion device mounted on the second railroad-vehicle and that supplies power to an electrical apparatus mounted on a vehicle, and
the auxiliary power supply comprises selection means that can select a connection point from the first power conversion device.

* * * * *